United States Patent
Kapron et al.

[11] 3,779,628
[45] Dec. 18, 1973

[54] OPTICAL WAVEGUIDE LIGHT SOURCE COUPLER

[75] Inventors: Felix P. Kapron, Elmira; Donald B. Keck, Big Flats, both of N.Y.

[73] Assignee: Corning Glass Works, Corning, N.Y.

[22] Filed: Mar. 30, 1972

[21] Appl. No.: 239,702

[52] U.S. Cl. ...... 350/96 WG, 65/DIG. 7, 350/96 R
[51] Int. Cl. ................................... G02b 5/14
[58] Field of Search ................................ 350/96 WG

[56] References Cited
UNITED STATES PATENTS
| | | |
|---|---|---|
| 3,295,911 | 1/1967 | Ashkin et al. .......... 350/96 WG UX |
| 3,614,197 | 10/1971 | Nishizawa et al. ......... 350/96 WG |
| 3,395,366 | 7/1968 | Snitzer et al. .......... 350/96 WG UX |

FOREIGN PATENTS OR APPLICATIONS
| | | |
|---|---|---|
| 1,807,574 | 7/1969 | Germany ...................... 350/96 WG |

*Primary Examiner*—John K. Corbin
*Attorney*—Clarence R. Patty, Jr. et al.

[57] ABSTRACT

A light coupler for efficiently utilizing light from a source of optical wave energy in the initiation of light mode propagation in an optical waveguide. The coupler comprises a tapered core of transparent material and a layer of transparent cladding material disposed upon the surface of the tapered core. The refractive index of the core is greater than that of the cladding layer. The core has a large diameter end terminating in an optically polished surface which is adapted to receive light from the light source. The small diameter end of the core is substantially aligned with the core of the optical waveguide.

3 Claims, 6 Drawing Figures

PATENTED DEC 18 1973      3,779,628

OPTICAL WAVEGUIDE LIGHT SOURCE COUPLER

BACKGROUND OF THE INVENTION

The continually increasing amount of traffic that communication systems are required to handle has hastened the development of high capacity systems. Even with the increased capacity made available by systems operating between $10^9$ Hz and $10^{12}$ Hz, traffic growth is so rapid that saturation of such systems is anticipated in the very near future. Higher capacity communication systems operating around $10^{15}$ Hz are needed to accommodate future increases in traffic. These systems are referred to as optical communication systems since $10^{15}$ Hz is within the frequency spectrum of light. Conventional electrically conductive waveguides which have been employed at frequencies between $10^9$ and $10^{12}$ Hz are not satisfactory for transmitting information at frequencies around $10^{15}$ Hz.

The transmitting media required in the transmission of frequencies around $10^{15}$ Hz are hereinafter referred to as "optical waveguides" which normally consist of an optical fiber having a transparent core surrounded by a layer of transparent cladding material having a refractive index lower than that of the core. It has been well known in the art that light can be propagated along a transparent fiber structure or light pipe having a higher refractive index than its surroundings. In such conventional optical fibers the ratio of the total diameter to the core diameter is almost unity, and the difference between refractive indices of the core and cladding material is made as large as possible. The total diameter to core diameter ratio of optical waveguide fibers is usually between about 10:1 and 300:1 for single-mode optical waveguides and is usually between about 1001:1000 and 10:1 for multimode optical waveguides, and the difference in indices of refraction is maintained small. This small difference between core and cladding refractive indices in optical waveguides results in an acceptance angle that is smaller than that of conventional optical fibers. Whereas the numerical aperture of commercial optical fibers of the conventional type is usually between about 0.3–0.4, the numerical aperture of an optical waveguide is usually about 0.1.

The fact that a single optical waveguide can be utilized to transmit one or more signals necessitates the coupling of at least one discrete light beam into a single waveguide fiber. Although light waveguides of the type disclosed in copending Pat. Application S.N. 36,267 filed by D. B. Keck et. al. on May 11, 1970, now U.S. Pat. No. 3,711,262, are capable of propagating light over long distances with relatively low attenuation, suitable means must be provided for efficiently coupling an optical source to such waveguides before a practical optical transmission system can be realized.

The light emission from a source for an optical waveguide must be highly directional in order to efficiently couple to the optical waveguide because of its low acceptance angle. Since only a very bright light source having the described characteristics can yield efficient coupling, only lasers have been considered for this role. Heretofore, light from conventional lasers has been focused onto the core of an optical waveguide in the manner disclosed in U.S. Pat. No. 3,395,331 issued to E. Snitzer. Since it is not always possible to focus the entire laser beam onto the fiber core, undesired cladding modes may be excited, resulting in low coupling efficiencies. For example, when a laser beam was focused down to about a 10 $\mu$m spot encompassing the 2 $\mu$m diameter core of an optical waveguide having a 125 $\mu$m diameter cladding, the $HE_{11}$ mode was excited with an efficiency of only about 50 percent. Moreover, semiconductor laser diodes, which are advantageous in that they are more rugged and compact than conventional lasers, emit light over a relatively large area, the smaller dimension of which is about 8–12 $\mu$m. When the light emitting portion of such a diode is disposed immediately adjacent to the end of an optical waveguide, the areal size of the emitted light beam is usually too large to enable efficient coupling thereof into the waveguide.

Summary of the Invention

It is therefore an object of the present invention to provide means for efficiently coupling a relatively large light source to an optical waveguide.

The light coupler of the present invention is useful in optical communication systems of the type comprising an optical waveguide, a source of optical wave energy, and a light coupler for coupling light from the source into an end of the optical waveguide to initiate the propagation of light waves in the waveguide. In accordance with the present invention the light coupler is characterized in that it comprises a tapered core of transparent material and a layer of transparent cladding material disposed upon the surface of the tapered core, the cladding material having a refractive index less than that of the tapered core material. The tapered core has a first optically polished end surface having a relatively large cross-sectional area which is adapted to receive light from the source of optical wave energy. The second end of the tapered core, which has a cross-sectional area smaller than that of the first surface, is substantially aligned with the core of the optical waveguide.

DESCRIPTION OF THE PREFERRED EMBODIMENTS

Figure 1:
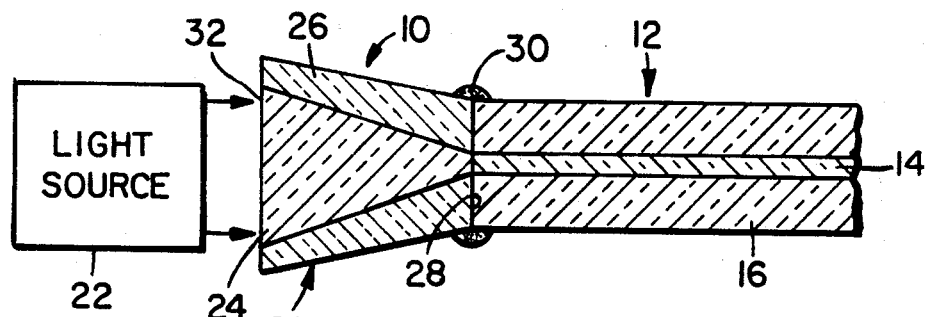
FIG. 1 is a cross-sectional view of the transmitting portion of an optical communication system including a light coupler constructed in accordance with the present invention.

FIG. 1 shows the transmission portion of an optical communication system including a waveguide input source 10 of optical wave energy coupled to the input end of an optical waveguide 12 which consists of a core 14 of transparent material having a given refractive index surrounded by a layer 16 of transparent cladding material having a refractive index lower than that of core 14. The diameter of core 14 may range from about the wavelength of light for a single mode waveguide up to about 1,000 μm for multimode waveguides, the maximum diameter being limited by the inflexibility of the fiber. Many multimode waveguides of current interest have core diameters less than 25 μm, since the bandpass of a waveguide decreases as the core size and the number of propagated modes increases. Since multimode waveguides which propagate fewer modes can carry much more information, such guides are preferred over those which propagate many thousands of modes. Waveguide input source 10 consists of a tapered optical waveguide fiber 20 and a light source 22 which is adapted to be energized by current pulses from a suitable electrical source (not shown). Tapered waveguide 20 functions as a light coupler for more efficiently utilizing light from source 22 in the initiation of light mode propagation in waveguide 12.

It is well known that the propagation of light waves in waveguides 12 and 20 can be studied in terms of modes, each of which has its own propagation and distribution characteristics. If the characteristics of an optical waveguide are such that the light intensity is distributed in and around the core, then that particular mode can be propagated along the waveguide for long distances with little attenuation. For example, the $HE_{11}$ has been propagated through waveguides of the type disclosed in the aforementioned Keck et al. application with an attenuation of no more than 20 dB/km.

The conditions under which propagation of a particular mode will no longer be localized within the core of an optical fiber can be expressed in terms of a cutoff value U. An exceptionally complex equation and an explanation thereof, from which the value of U for a particular mode can be determined may be found on page 55 of *Fiber Optics - Principles and Applications* by N. S. Kapany. Kapany also expresses a fiber characteristic term R, now commonly referred to as V, in terms of the optical fiber variables by the equation $$V = 2\pi a/\lambda \sqrt{n_1^2 - n_2^2}$$

1.

where $a$ = core radius of the waveguide $\lambda$ = wavelength of light to be transmitted $n_1$ = core index of refraction $n_2$ = cladding index of refraction which can be rewritten as $$V = 2\pi a/\lambda \sqrt{(n_1 + n_2)(n_1 - n_2)}$$

2.

Then, as is explained in Kapany, for a particular mode to propagate within an optical fiber having a particular fiber characteristic term V, V must be greater than or equal to the cutoff value U for said mode.

For example, the $HE_{11}$ mode is the only mode of light that will propagate along a fiber which has a V value of less than 2.405. Therefore, if V is set equal to 2.405, and equation (2) is evaluated, it can be seen that a method of limiting light propagation of a desired wavelength to one mode is to coordinate the parameters a, $n_1$ and $n_2$ of the waveguide. That is, if the difference between the two indices of refraction $(n_1 - n_2)$ increases, the core radius a must decrease, and if the quantity $(n_1 - n_2)$ decreases, the core radius a must increase.

The intensity of light in an optical waveguide decreases as the radial distance from the waveguide center increases. Theoretically, of course, this intensity will never be zero regardless of the radial distance from the waveguide center the light travels. By proper selection of the core diameter, and the core and cladding indices of refraction, the decrease in intensity can be made to be so rapid, however, that the intensity can be presumed to be zero at a finite radial distance from the center of a straight section of optical waveguide. There is no intensity distribution common to all waveguides, and intensity distribution will vary with the core diameter, the index of refraction of the core and cladding glass, and with the frequency of the light being transmitted; that is, within the same waveguide infrared light will have a different intensity distribution than will ultraviolet light. If the intensity of the light has not decreased to a very low level when it reaches the cladding-surrounding medium interface of the optical waveguide, light could strike said interface, be dispersed and then be reflected back into the waveguide core region or some of the light striking the interface could escape from the optical waveguide as radiation loss. The light coupler of the present invention as well as waveguide 12 can be analyzed in accordance with the foregoing theories and equations.

Tapered waveguide 20 consists of a tapered core 24 surrounded by a layer 26 of cladding material having a refractive index which is lower than that of core 24. The smaller end of tapered waveguide 20 may be polished and butted against the polished end of waveguide 12 to form an interface 28. Cores 14 and 24 can be aligned by observing the relative positions thereof under a microscope and correcting for nonalignment by adjusting micromanipulators attached to fibers 12 and 20. This type of alignment is possible since cores 14 and 24 can be seen through their respective transparent claddings. Fibers 12 and 20 could also be manipulated until a maximum amount of light energy is coupled from source 22 into fiber 12 as evidenced by maximum light output from fiber 12. A bead 30 of glue, sealing glass or other bonding material may be applied to the junction of fibers 12 and 20 to maintain proper alignment.

Light source 22, which may be any source capable of directing a beam of light into the large optically polished end 32 of core 24, is preferably a coherent light source such as a conventional laser with or without light converging means or a laser diode which may be disposed directly on surface 32. A laser diode or other solid state light source may be formed directly upon surface 32 or it may be a discrete element bonded to that surface.

In the embodiment illustrated in FIG. 1 the refractive indices of the tapered core 24 and layer 26 are constant. In accordance with equation (1), that portion of the tapered waveguide having the greatest radius has the largest V value and therefore supports the largest number of modes. The energy of the light incident upon the core is divided among all of the modes which can be supported or propagated in that portion of the tapered waveguide. The gradual taper of the core continuously reduces the V value of the tapering guide and causes a corresponding reduction in the number of modes propagated. As the higher order modes are cut off one by one, some mode conversion occurs, so that some of the energy of the cut-off modes is converted to lower order modes, the remaining energy of the cut-off modes being lost as radiation. This mode conversion continues throughout the length of the tapered guide resulting in the propagation of relatively few lower order modes, the number of which is dictated by the smallest radius of the tapered core.

Since an increasing amount of light energy spreads into the cladding as the core radius decreases, the thinnest portion of the cladding layer must be such that only an insignificant amount of the evanescent wave penetrates to the cladding-surrounding interface. Thus, the cladding-to-core radius ratio may be smaller at surface 32, where the core radius is large, than at interface 28, where the core radius is small. If the tapered waveguide 20 is made by a fiber redraw process, it may be convenient to have a constant core radius-to-cladding radius ratio since this radius relationship usually naturally results from such a process.

The fractional rate of change of $V$ should be small within a distance of a wavelength to prevent excessive backscatter, a one percent change in $V$ per wavelength being thought to be permissible. In a specific embodiment, core 24 may consist of fused silica doped with two percent titania and cladding 26 may consist of pure fused silica. The refractive indices of such core and cladding materials are 1.4617 and 1.4570, respectively. If the core radius at surface 32 is 400 $\mu$m, which is typical of the size of conventional LED sources, the $V$ value at surface 32 is 467 for a wavelength of 6,300A. At interface 28 the radius is 40 $\mu$m, indicating that the waveguide 12 into which light is being coupled is of the multimode type. The $V$ value of the core at interface 28 is 46.7. For a linear taper, the tapering distance required, i.e., the distance between surface 32 and interface 28, should be at least 600 $\mu$m to meet the requirement that the change in $V$ per wavelength be no more than one percent. About 11,000 modes would propagate in the core of such a coupler at the input surface 32, and about 1,100 modes would propagate in the core at interface 28.

Figure 2:
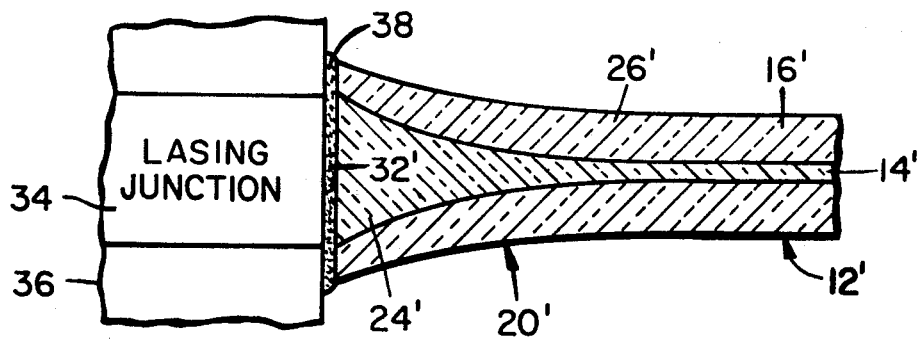
FIG. 2 is a cross-sectional view of an alternative embodiment wherein the light coupler and optical waveguide are a single integral structure.
Figure 3:
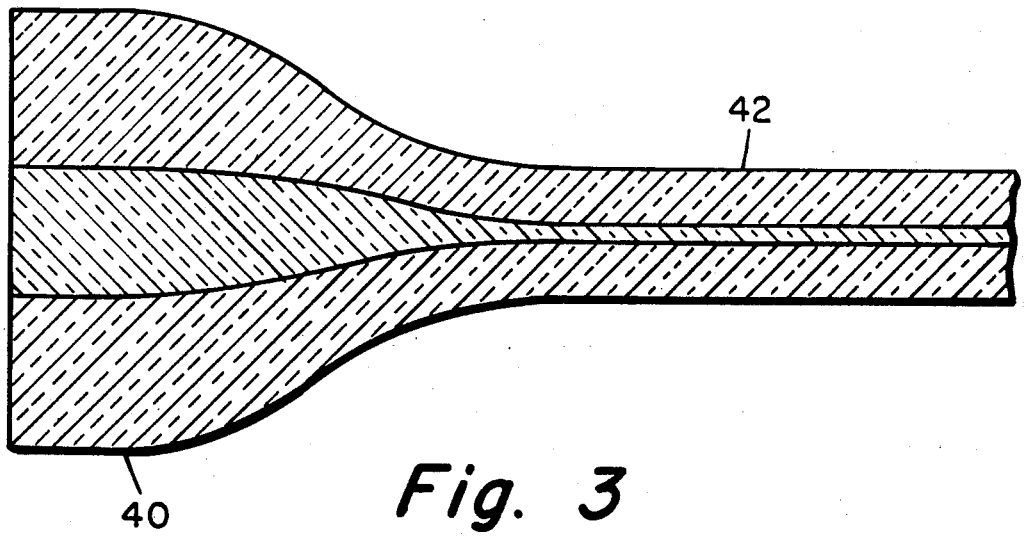
FIG. 3 shows a cross-sectional view of a further embodiment of the present invention.

As shown in FIG. 2, wherein elements similar to those of FIG. 1 are designated by primed reference numerals, the radius of core 24' at surface 32' is large enough to encompass the width of the light emitting junction 34 of laser diode 36, a portion of which is illustrated. Diode 36 may be secured to the surface 32' by a layer 38 of light transmitting bonding material. It is further illustrated in this figure that the radius of core 24' need not decrease linearly, but it is noted that the core radius should decrease monotonically. Furthermore, tapered waveguide 20' may be an integral part of waveguide 12'. Such an integral structure is advantageous in that it contains no light reflecting interface such as interface 28 of FIG. 1, but it may be more difficult to fabricate than the embodiment of FIG. 1. The structure of FIG. 2 may be made by drawing a fiber 12' of constant diameter from a larger diameter fiber and severing the resultant fiber at the desired point beyond fiber 12' where the core radius is sufficiently large. Although the monolithic core structure of FIG. 2 is advantageous in that it avoids the light diffracting interface of the embodiment of FIG. 1, the tapered waveguide section 20' of FIG. 2 may be excessively long due to the manner in which it is fabricated. It is obvious that FIG. 2, as well as all of the figures depicting optical waveguides and light couplers, is not drawn to scale but is presented in such a manner as to best illustrate the present invention. As shown in FIG. 3, a portion of a larger diameter fiber 40 from which optical waveguide 42 is redrawn may be retained as part of the light coupler.

Figure 4:
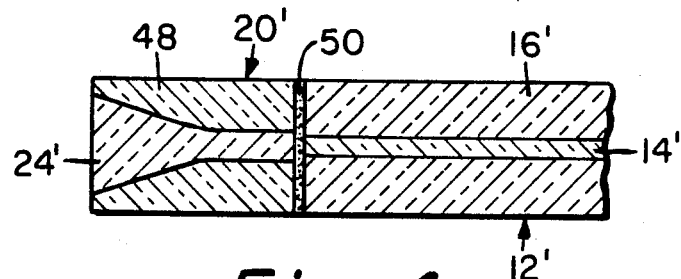
FIG. 4 shows a cross-sectional view of a light coupler having a constant cladding radius.

In the embodiment shown in FIG. 4, wherein elements similar to those of FIG. 1 are indicated by primed reference numerals, tapered waveguide 20' is characterized in that it has a tapering core 24' but the cladding 48 thereof has a constant radius which approximates that of layer 16' of optical waveguide cladding material. In the embodiments of FIGS. 1 through 4 the thinnest portion of the cladding layer must be large enough to prevent any significant evanescent energy from reaching the outer surface of the cladding layer. This minimum cladding thickness should be at least ten times greater than the wavelength of light propagating through the device.

The minimum radius of core 24' may be larger than that of core 14', as illustrated in FIG. 4, or it could be smaller than that of core 14' but in either case it is preferred that the V value of waveguide 12' approximates that of the adjacent portion of tapered waveguide 20'. In the preferred embodiment, the two core radii are equal and the cores are made of the same material. Moreover, the waveguide cladding and coupler cladding need not be the same diameter at the junction therebetween.

As shown in FIG. 4 a thin layer 50 of bonding material may be used to attach tapered waveguide 20' to the end of optical waveguide '. The layer 50 may consist of epoxy or other suitable bonding material having a refractive index approaching that of cores 14' and 24'.

Figure 5:
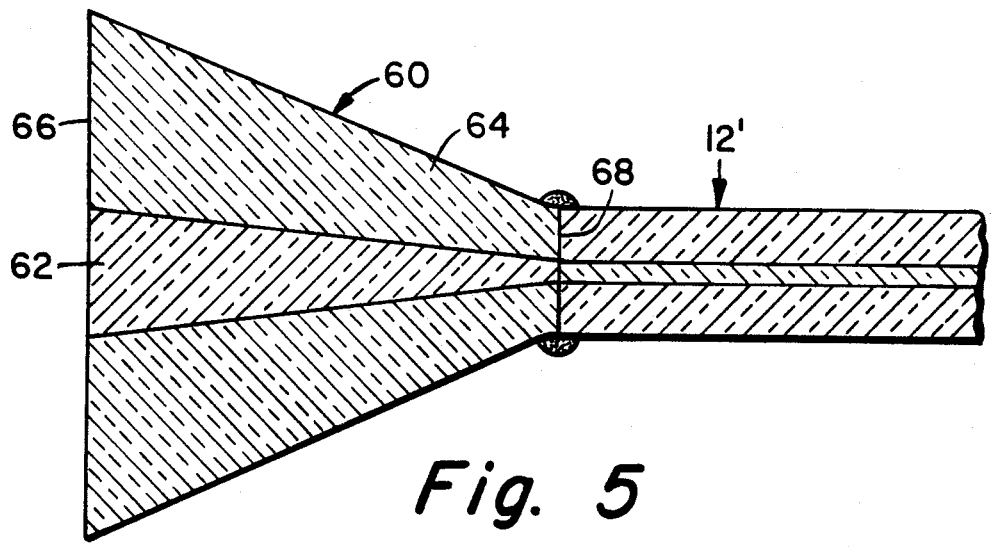
FIG. 5 shows a cross-sectional view of an alternative embodiment wherein the V value of the tapered waveguide section is constant throughout its entire length.

In the embodiment of FIG. 5 a few select lower order modes propagate throughout the entire length of tapered waveguide 60 which consists of core 62 and cladding layer 64. This type of propagation is caused by maintaining the $V$ value of the tapered waveguide 60 approximately constant throughout its entire length. If it were desirable to match the $V$ value of tapered waveguide 60 to that of waveguie 12' for example, then the refractive indices of core 62 and cladding 64 at any point along the longitudinal axis of tapered waveguide 60 would be chosen in accordance with the equation $$n_1 = [n_2^2 + (\lambda V/2\pi a^2)]^{1/2}$$

3.

where $V$ is the $V$ value of waveguide 12' and a is the radius of the core at said point. Hence, near the large entrance surface 66 of the tapered waveguide, the indices of refraction must be kept rather close to each other, the refractive index difference increasing continously with decreasing core radius as the interface 68 between tapered waveguide 60 and optical waveguide 12' is approached. Approximately the same large cladding-to-core radius ratio should be maintained throughout to contain the evanescent wave satisfactorily.

The refractive indices of the core and cladding materials of the light coupler could also be such that the $V$ value of the tapered light coupler varies throughout the length thereof at a rate which is less than that when the refractive indices of the core and cladding materials are constant. For example, the refractive index of the core could vary in a manner similar to that described in conjunction with FIG. 5, but the change in refractive index need not be as great as that required for the embodiment of FIG. 5.

Figure 6:
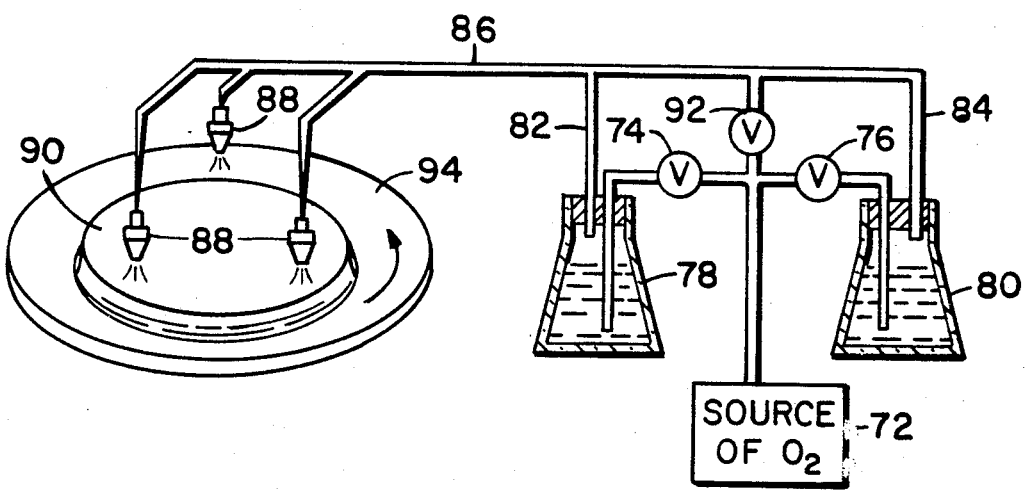
FIG. 6 schematically illustrates an apparatus for forming the core of the coupler of FIG. 5.

The variable index core 62 of FIG. 5 may be formed by the apparatus illustrated in FIG. 6, which forms a boule of doped fused silica by a frame hydrolysis process similar to that described in U.S. Pat. No. 2,272,342 issued to J. F. Hyde, and U.S. Pat. No. 2,326,059 issued to M. E. Nordberg. Dry oxygen from source 72 passes through valves 74 and 76 and into flasks 78 and 80, respectively. In flask 78 the oxygen is bubbled through silicon tetrachloride, $SiCl_1$ and in flask 80 the oxygen is bubbled through titanium tetrachloride, $TiCl_4$, both flasks being maintained at a temperature of about 35°C. $SiCl_4$ and $TiCl_4$ vapors picked up by the oxygen are then passed through tubes 82 and 84, respectively and through a delivery tube 86 to burners 88 where these vapors are hydrolyzed to form a boule 90 of doped fused silica on rotating substrate 94. Oxygen from source 72 is directly coupled to tube 86 by a value 92 to maintain the proper mixture in tube 86. Boule 90 is formed on a rotating substrate 94 in order that the refractive index gradient be more uniform across the boule. As the process is initiated, valve 76 is adjusted to a predetermined position so that the mixture of $SiCl_4$ and $TiCl_4$ is appropriate to provide a sufficient amount of titanium oxide in the deposited fused silica to provide the desired refractive index. As the thickness of boule 90 increases, valve 76 is adjusted in such a manner that the amount of titanium oxide deposited with the fused silica and consequently the refractive index of the doped fused silica changes in the desired manner. Although only three burners 88 are illustrated, more burners can be utilized in order to form a boule having a more uniform refractive index gradient. After boule 90 is completely formed, a plurality of plugs may be removed therefrom, each having the desired refractive index variation from one end to the other. Each plug, which may be either conically or cylindrically shaped, is polished and inserted into a correspondingly shaped core in a pure fused silica tube. This composite body may be drawn as previously described to form tapered waveguide 60 of FIG. 5.

The refractive index of both core 62 and cladding 64 of waveguide 60 could vary throughout the length of tapered waveguide 60 in such a manner that the $V$ value at any point along the longitudinal axis thereof is constant. Such tapered waveguide could be formed from core and cladding sections both initially formed by the process described in connection with FIG. 6. However, it is preferable to vary the refractive index of only the core or only the cladding while maintaining the refractive index of the other component constant.

The cross-sectional shape or configuration of an optical waveguide is substantially circular, and it is therefore preferred that the cross-sectional shape of the smaller end of the light coupler also be circular. However, this portion of the coupler could have any desired shape depending upon the shape of the waveguide into which it must couple light. Similarly, the input or larger end of the light coupler could be elliptical or elongated in some other manner depending upon the shape of the light emitting area of the light source. For example the larger end of the coupler could be elliptical in cross-section and the smaller end could be circular.

We claim:

1. In an optical communication device of the type comprising,
   an optical waveguide having a core of transparent material and a layer of transparent cladding material disposed upon the surface of said core,
   a source of optical wave energy, and
   a light coupler having an input end for receiving light from said source and an output end for emitting light into said waveguide to initiate the propagation of light waves therein,
   said light coupler being characterized in that it comprises a tapered core of transparent material and a layer of cladding material disposed upon the surface of said core, the refractive index of said core material being greater than that of said cladding material, said core having a large diameter end at the input end of said coupler and a small diameter end at the output end of said coupler, said input end having a polished surface adapted to receive light from said source, said small diameter end of said core being substantially aligned with the core of said optical waveguide, the minimum thickness of said coupler cladding layer being at least ten times the wavelength of the light which said source is adapted to provide, said tapered core and said coupling cladding layer constituting a tapered optical waveguide having a V value at any point along the longitudinal axis thereof determined by the equation $$V = 2\pi a/\lambda \sqrt{n_1^2 - n_2^2}$$

where a is the radius of the core at said point, $\lambda$ is the wavelength of light to be transmitted by said coupler, $n_1$ is the index of refraction of said tapered core at said point, and $n_2$ is the index of refraction of said coupler cladding layer at said point, any change in $V$ value along said longitudinal axis being less than one percent per wavelength- $\lambda$, the $V$ value of said coupler being substantially constant throughout the length thereof.

2. An optical communication device in accordance with claim 1 wherein the refractive index $n_2$ of said coupler cladding layer is a constant value and the refractive index $n_1$ of said tapered core at any point along the longitudinal axis of said tapered core varies substantially in accordance with the equation $$n_1 = [n_2^2 + (\lambda V/2\pi a)^2]^{1/2}$$

wherein $V$ is equal to the $V$ value of said optical waveguide, $\lambda$ is the wavelength of light which said source is adapted to provide and a is the radius of said core at said point.

3. An optical communication device in accordance with claim 1 wherein the refractive index of said tapered core varies throughout the length thereof.

* * * * *